United States Patent
Rao et al.

(10) Patent No.: US 10,339,550 B2
(45) Date of Patent: Jul. 2, 2019

(54) GAMIFIED PROJECT MANAGEMENT SYSTEM AND METHOD

(71) Applicant: Quest 2 Excel, Inc., Saratoga, CA (US)

(72) Inventors: Mahesh C. Rao, Saratoga, CA (US); Andrew Jay Hoffman, San Anselmo, CA (US); Marcello Rufus Hunter, Potomac Falls, VA (US); David E. Shough, El Dorado, CA (US)

(73) Assignee: QUEST 2 EXCEL, INC., Cupertino, CA (US)

( * ) Notice: Subject to any disclaimer, the term of this patent is extended or adjusted under 35 U.S.C. 154(b) by 88 days.

(21) Appl. No.: 14/084,534

(22) Filed: Nov. 19, 2013

(65) Prior Publication Data

US 2014/0164037 A1    Jun. 12, 2014

Related U.S. Application Data

(63) Continuation-in-part of application No. 13/711,563, filed on Dec. 11, 2012, now abandoned.

(51) Int. Cl.
    *G06Q 10/10*    (2012.01)
    *G06Q 30/02*    (2012.01)
    *G06Q 10/06*    (2012.01)

(52) U.S. Cl.
    CPC ....... *G06Q 30/0207* (2013.01); *G06Q 10/103* (2013.01); *G06Q 10/06311* (2013.01); *G06Q 10/063112* (2013.01); *G06Q 10/063114* (2013.01); *G06Q 10/10* (2013.01); *G06Q 10/101* (2013.01); *G06Q 10/1093* (2013.01); *G06Q 10/1095* (2013.01); *G06Q 10/1097* (2013.01)

(58) Field of Classification Search
    CPC ..... G09B 5/00; G06Q 10/103; G06Q 30/0207
    USPC .......................................... 434/350, 322–323
    See application file for complete search history.

(56) References Cited

U.S. PATENT DOCUMENTS

| | | | | |
|---|---|---|---|---|
| 5,964,660 A | * | 10/1999 | James | ..... A63F 13/12 463/1 |
| 6,408,263 B1 | * | 6/2002 | Summers | ..... G06Q 99/00 434/107 |

(Continued)

*Primary Examiner* — Robert J Utama
(74) *Attorney, Agent, or Firm* — Stephen E. Zweig

(57) ABSTRACT

Gamified computerized project management system and method which harnesses the innate human desire for playful competition and continual skill advancement to improve organizational productivity. The system allows team member bidding on project tasks, where they accumulate points according to various criteria including how well their work product meets previously established criteria, as well as an opportunity to acquire additional points from mastering various task related learning material. Other factors, such as providing assistance to other team members, evaluating work product, and the like are also awarded points. Competition is fostered by allowing team members to see where their point score ranks versus other players, while teamwork and member skill growth is also encouraged. Gamified project management files containing comprehensive project records may be saved, converted to standard project management files, or constructed by translation process that gamifies standard project management files. Standard prefabricated gamified project files may also be used.

24 Claims, 12 Drawing Sheets

(56) References Cited

U.S. PATENT DOCUMENTS

| | | | | |
|---|---|---|---|---|
| 6,470,482 | B1* | 10/2002 | Rostoker | G01R 31/31704 714/E11.167 |
| 6,500,008 | B1* | 12/2002 | Ebersole | A62C 99/0081 345/441 |
| 6,817,613 | B2* | 11/2004 | Hasek | A63F 3/00063 273/256 |
| 7,124,164 | B1* | 10/2006 | Chemtob | G06Q 10/10 709/204 |
| 7,155,158 | B1* | 12/2006 | Iuppa | G09B 9/003 434/236 |
| 8,145,516 | B2* | 3/2012 | Blanchard, III | A63F 13/10 705/7.12 |
| 8,469,713 | B2* | 6/2013 | Kron | G09B 23/28 434/156 |
| 2002/0010571 | A1* | 1/2002 | Daniel, Jr. | G05B 23/0216 703/21 |
| 2002/0035506 | A1 | 3/2002 | Loya | |
| 2002/0119434 | A1* | 8/2002 | Beams | G09B 7/00 434/322 |
| 2002/0146667 | A1* | 10/2002 | Dowdell | G09B 7/02 434/62 |
| 2003/0022139 | A1* | 1/2003 | Adams | G09B 5/02 434/219 |
| 2004/0097287 | A1* | 5/2004 | Postrel | G07F 17/32 463/41 |
| 2005/0004789 | A1* | 1/2005 | Summers | G06Q 10/10 703/22 |
| 2005/0233295 | A1 | 10/2005 | Chiszar et al. | |
| 2006/0024655 | A1* | 2/2006 | Bambrick | G09B 7/02 434/350 |
| 2006/0173731 | A1 | 8/2006 | Scarpelli | |
| 2007/0050238 | A1 | 3/2007 | Carr et al. | |
| 2007/0192748 | A1 | 8/2007 | Matin et al. | |
| 2008/0299531 | A1 | 4/2008 | Jensen | |
| 2008/0177623 | A1* | 7/2008 | Fritsch | G06Q 10/0633 705/7.27 |
| 2009/0043621 | A1 | 2/2009 | Kershaw | |
| 2009/0198636 | A1 | 8/2009 | Jackson et al. | |
| 2010/0191583 | A1* | 7/2010 | Mackenzie | G06Q 10/063112 705/7.14 |
| 2010/0233663 | A1* | 9/2010 | Pennington | G09B 19/00 434/219 |
| 2010/0268686 | A1 | 10/2010 | Germainy, II | |
| 2010/0316986 | A1 | 12/2010 | De La Chicha et al. | |
| 2010/0331075 | A1* | 12/2010 | Michelstein | A63F 13/12 463/23 |
| 2011/0294565 | A1* | 12/2011 | Michelstein | A63F 13/12 463/23 |
| 2012/0142429 | A1* | 6/2012 | Muller | A63F 13/795 463/42 |
| 2012/0215578 | A1* | 8/2012 | Swierz, III | G06Q 50/205 705/7.14 |
| 2013/0035581 | A1* | 2/2013 | Vesto | G06F 19/322 600/407 |
| 2013/0295545 | A1* | 11/2013 | Dawley | G09B 7/02 434/350 |
| 2014/0031130 | A1* | 1/2014 | Janakiraman | A63F 13/12 463/42 |
| 2015/0006425 | A1* | 1/2015 | Ayad | G06Q 50/2057 705/328 |

* cited by examiner

Figure 4

QUEST2EXCEL | Quest Map | Tools & Tips | Awards | Deliverables

Select:
All My Quests

Sort by:
Missions

▷ Welcome Onboard

▽ Welcome Back to Welcome Onboard

- Quest to ... What?
- Who are all these pe...
- Walkthrough
- Lingo Land
- Stylin'
- Some assembly required ▷ Quest-o-Rama ▽ Agile Transformation

- Let's get ready to (...
- Getting up to speed
- Put me in, Coach!
- Sprint 1 (Waterfall: 0)
- Sprint 2 (Waterfall,...

Figure 6

| | | | 332 |
|---|---|---|---|
| Done Done | Due : Dec 31 2013 | | 📖 |

Tool & Tips: Done Done completed

| ☐ Title | Type | Category | |
|---|---|---|---|
| ☐ How to write a formal proposal | Document | Process overview | . (Wa... |
| ☐ Identifying Key Work Processes | Document | Process overview | up to it? |
| ☐ How to Chart (Map) Your Process: A Step by Step Tutorial | Document | Process overview | |
| ☐ Identify and Innovate your Key Work Processes to Achieve Organizational Success | Document | Process overview | |
| Core versus Support Processes | Hyperlink | Process overview | |
| Top 7 Steps to Identify Core Business Processes | Hyperlink | Process overview | 600 |
| Identifying Business Processes | Hyperlink | Process overview | |
| Tools & Techniques for Process Improvement | Hyperlink | Process overview | |
| Improving Business Processes Streamlining Tasks to Improve Efficiency | Hyperlink | Process overview | |
| ☐ Quest Creation, Step 2 | Document | Process overview | |

Download Selected File

Vision Quest   Due : Jul 11 2013

Task Completed: Aug 25 2013                    Score: 342 pts

▼ Description

Quest : Welcome Back...  Mission : Quest to ... W...
Where are we going?Where will Q2E be in 5 years?Think of Q2E's future state--
and draft a vision statement.(Make it inspiring!)

Prerequisite -  none

702

▼ Instructions

| Team up | Bonus up to.. | Success Measures |
|---|---|---|
| Work collaboratively as a team to draft a Vision statement. | +5.00% | ◎ |

704

▼ Deliverables

706

| Title | Date Linked | Owner |
|---|---|---|
| based on fedback from all team members | 07/12/2013 | Pat McMahonPlayer |

▼ Rating

|  | Poor | Satisfactory | Good | Excellent | Exceeds Expectation |
|---|---|---|---|---|---|
| How well does the vision statement capture Q2E goals, ambitions, and challenges? |  |  |  | ■ |  |
| How succinct is the vision statement? |  |  |  |  | ■ |
| How accurately does the vision statement reflect the company's values? |  |  |  | ■ |  |
| How collaborative is the Vision development process? |  |  |  |  | ■ |

708

■Reviewer:Andy HoffmanPlayer

▼ Comments

710

ADD COMMENT

| Deliverables | | | | | | |
|---|---|---|---|---|---|---|
| Title ▲ | Author | Date Uploaded | Type | Quest | Mission | Task |
| 1 of 3 | Dave ShoughPlayer | Mar 14, 2013 | .DOCX | As-Is Assessme... | Gather Backgro... | Strategize and Plan |
| 2 of 3 | Pat McMahonPlayer | Jun 28, 2013 | .PPTX | Welcome Onboard | Some assembly ... | Secret Sauce |
| 3 of 3; source material for a... | Pat McMahonPlayer | Jun 28, 2013 | .PPT | Welcome Onboard | Some assembly... | Secret Sauce |
| A sample business card for Andy | Pat McMahonPlayer | Jun 28, 2013 | .DOCX | Welcome Onboard | Some assembly ... | Secret Sauce |
| | Kasey ArnoldInc... | Jun 28, 2013 | .JPG | Welcome Onboard | Stylin' | I got carded! |

GAMIFIED PROJECT MANAGEMENT SYSTEM AND METHOD

CROSS REFERENCE TO RELATED APPLICATIONS

This application claims the priority benefit of U.S. patent application Ser. No. 13/711,563 entitled "SYSTEM, METHOD, AND COMPUTER PROGRAM PRODUCT FOR GAMIFICATION OF BUSINESS PROCESSES", inventors Mahesh C. Rao, Andrew Jay Hoffman, Marcello Rufus Hunter, and David E. Shough, filed Dec. 11, 2012; the complete contents of this application are incorporated herein by reference.

BACKGROUND OF THE INVENTION

Field of the Invention

The present invention is generally related to business processes that include project management, learning management, content management, and human resources.

Description of the Related Art

Project management is the discipline of planning, organizing, securing, managing, leading, and controlling resources to achieve specific goals. A project is a temporary endeavor with a defined beginning and end (usually time-constrained, and often constrained by funding or deliverables), undertaken to meet unique goals and objectives, typically to bring about beneficial change or added value.

The primary challenge of project management is to achieve all of the project's goals and objectives while honoring the preconceived constraints. The primary constraints are scope, time, and budget. Other project management considerations, however, which ideally would also be considered, but which are typically not considered, includes transparency/visibility, quality, and creativity. Thus, in the example of FIG. 1, conventional project management software typically divides a project into a fixed set of tasks and assigns tasks to individual team members (e.g. employees), also known as task owners, to be completed according to a schedule.

Due to the complexities of project management, an extensive amount of prior art has been devoted to various methods of computerizing the process. Generally, project management is computerized through various types of project management software. Modern project management software, although it can be configured to run on just one computer, is generally configured to run on networked computers, often with the aid of one or more servers and various client devices. Examples of widely used prior art computerized project management systems include Microsoft project, and Microsoft Office Project server, Oracle Primavera EPPM, SAP Business ByDesign, HP Project & Portfolio Software, and the like.

Some of the functions performed by prior art project computerized management systems include scheduling, issue tracking, project portfolio management, resource management, document management, and reporting and analysis. Project management systems may also output project data in various formats, such as PERT and Gantt charts, and the like.

Conventional computerized project management approaches have many drawbacks. In particular, they often create work environments in which individuals narrowly focus on the task assigned to them based on the schedule and the budget. The work environment is often not mentally and emotionally stimulating for the task owners. Additionally, as previously discussed, conventional project management approaches do not emphasize transparency, quality and creativity.

A further drawback of conventional computerized project management systems is that they are not integrated with learning management. In many modern work environments, employees must also be trained and educated to learn various skills and background knowledge. Conventional approaches to learning management, such as giving employees lectures or intensive one-day trainings, often results in poor knowledge retention.

BRIEF SUMMARY OF THE INVENTION

The invention is based, in part, on the insight that humans have an innate desire to playfully compete with one another, as well as an innate desire to see that their skills are advancing over time. This is one of the reasons why computerized games, in particular online multiplayer computer games, are so popular. Players can compete with other players, receive continual and prompt feedback as to their score in the game relative to other players, and can also receive feedback that their skills in playing the game are continually advancing during the course of the game.

The invention is also based, in part, on the insight that project management and organizational productivity can be improved if these innate human desires for playful competition and continual skill advancement can be harnessed and integrated into the framework of computerized project management systems, thus providing a gamified (computerized) project management system.

The invention is also based, in part, on the concept that to improve transparency, evidence of completed work product (relevant to the various project tasks) should be entered into the system. The invention further provides a mechanism to allow this evidence of completed work to be reviewed versus one or more previously established task standards. Additionally, the invention can provide a mechanism to allow the resulting work product review to be at least a substantial part of a team member/players score. At the same time, to prevent playful competition from degenerating into harmful competition, the invention can also provide a mechanism to award team member/players additional score credit for helping other team member/players to complete their assigned tasks.

The invention is also based, in part, on the further insight that to provide the sense of continual skill advancement, it is often also useful to configure the gamified project management system to provide at least some learning content materials. To encourage team member/players to improve their skills, their progress in mastering these learning content materials can also be scored and evaluated, and incorporated along with work product and helping others (teamwork) into that team member/player's overall score.

The invention is also based, in part, on the insight that to prevent playful competition from degenerating into harmful competition, some checks and balances should be placed into the system. For example reviewer feedback can be monitored and normalized to prevent favoritism, and various other automatic algorithms (rubrics) can be used to ensure that the "project management game" is considered reasonably fair by the various team members.

The invention is also based, in part, on the insight that to facilitate uptake of such a gamified project management system, it is further useful to provide methods and systems to transform between standard and gamified project management files. Additionally, since gamified project management files may be more demanding than standard project management files to produce, it is also useful to provide methods and systems by which various standardized (i.e. prefabricated) gamified project management system files can be provided and then used as the building block for customized gamified project management system files.

Thus in one embodiment, the invention may be a gamified computerized project management system and method that harnesses the innate human desire for playful competition and continual skill advancement to improve organizational productivity. The system may allow team members to bidding on at least some project tasks (and even with different project options as well). The system automatically keeps track of both the points from individual team members, as well as the team's points, and points allocated to various project tasks and activities, such as learning, communicating with colleagues, completing paperwork, and the like.

Individual team members accumulate points according to various criteria including how well their work product meets previously established criteria. The system also allows individual team members to acquire additional points from mastering various task related learning material. Individual team members may also be rewarded points according to other factors, such as providing assistance to other team members, evaluating work product, and the like.

Competition is fostered by allowing team members to see where their individual point score ranks versus other team member (players), while teamwork and member skill growth is also encouraged. The system's gamified project management files containing comprehensive project records may be saved, converted to standard project management files, or constructed by translation process that gamifies standard project management files. Standard prefabricated gamified project files may also be used.

BRIEF DESCRIPTION OF THE DRAWINGS

FIG. 4 shows more detail of the project or "Quest" portion of the user interface, previously shown in FIG. 3. Team members can use this interface to accept or bid on one or more tasks, as well as to track their progress according to various task milestones.

FIG. 6 shows one embodiment where by selecting the "Tool & Tips" icon shown on FIG. 3, a team member can access learning content appropriate to that team member's tasks. The system can also be configured to test the team member's proficiency at learning the provided learning content, and use this information to determine when more sophisticated learning content should be provided.

FIG. 7 shows a detail of the user interface where a team member's performance on a given task (here evidence of completed work in the form of a deliverable work file has been uploaded) can be reviewed by one or more reviewers (who can be other team members, managers, etc.). In this example, the evidence of completed work from team member (player) Pat McMahon is being reviewed by another team member (player) Andy Hoffman, and Andy is entering his input on various criteria by selecting various sliders.

FIG. 11 shows how; in some embodiments team members (players) may use their accumulated points to choose various rewards from a catalog.

FIG. 12 shows how the entire work product added to the system is saved in memory (e.g. see the FIG. 2 task files data field (223). This data can be fully searchable by quest/project, mission/milestone, task, team member score and other aspects. This information is useful, because it allows organizations to reconstruct successful processes, and avoid failed ones.

DETAILED DESCRIPTION OF THE INVENTION

Figure 1:
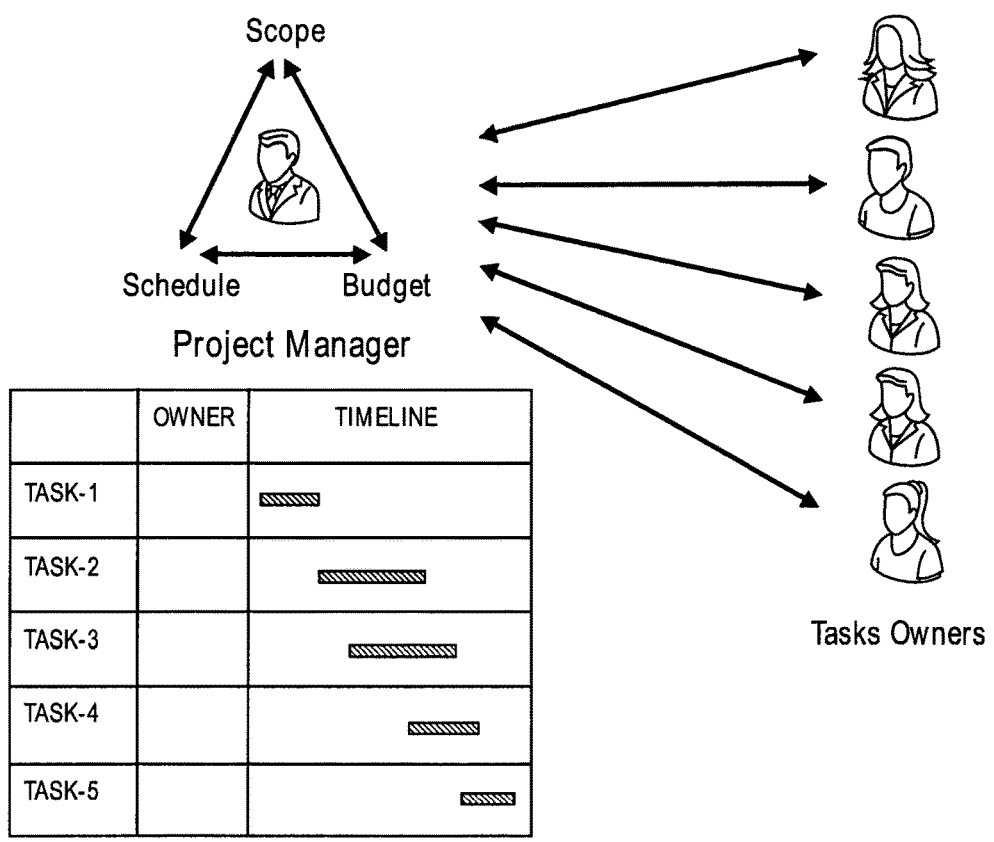
FIG. 1 illustrates project management in accordance with the prior art.

FIG. 1 illustrates the conventional project management approach used in many businesses. Project management is the discipline of planning, organizing, securing, managing, leading, and controlling resources to achieve specific goals. A project is a temporary endeavor with a defined beginning and end (usually time-constrained, and often constrained by funding or deliverables), undertaken to meet unique goals and objectives, typically to bring about beneficial change or added value.

Review and Discussion of Parent U.S. patent application Ser. No. 13/711,563

As previously described in parent U.S. patent application Ser. No. 13/711,563, the contents of which are incorporated herein by reference, the problem with prior art computerized project management software and methods is that although the prior art methods generally focus adequately on managing project scope, schedule, and budget, they don't adequately award cooperation among team members, and they miss important insight into the psychology of motivating team members to strive harder in their efforts. The prior art computerized project management systems also tended to totally neglect important management functions such as how to adequately impart the necessary skills to the appropriate team members (e.g. the prior art ignored issues regarding learning management software and systems). Thus application Ser. No. 13/711,563 proposed an apparatus, system, method, and computer program product for implementing a business process as an "augmented reality" game that also incorporated various learning management technology as well.

In deference to the terminology used in the original Ser. No. 13/711,563 disclosure, the term "augmented reality" will be occasionally used in the present disclosure as well. However to avoid confusion, note that the term "augmented reality" was not used by application Ser. No. 13/711,563 in the standard dictionary (e.g. Merriam Webster dictionary) sense of being "an enhanced version of reality created by the use of technology to overlay digital information on an image of something being viewed through a device (as a smartphone camera), or the technology used to create augmented reality."

Rather, in the context of both the original application Ser. No. 13/711,563 disclosure and the present disclosure, the term "augmented reality" might better be described as an "augmented computerized project management system"; or more specifically a "game augmented computerized project management system". Put alternatively, the disclosure can be considered to cover augmented reality games that are based on a mixture of game play and game mechanics with real world activity, but which don't necessarily require enhanced device camera images.

Although the systems and methods described in parent application Ser. No. 13/711,563, as well as the present disclosure, are of course, intended to describe real projects, rather than imaginary projects or games, there is no requirement that the invention operate by overlaying digital information on an image (e.g. camera image) of something viewed through a device. That is, there need not be any camera acquired image, and no overly of digital information on camera image type limitations was or is intended to be implied by this usage. Thus in general, the term "augmented reality" as previously used in Ser. No. 13/711,563 might better be construed to mean "game augmented computerized project management system". To avoid confusion, the present claims will use this alternative terminology.

As application Ser. No. 13/711,563 taught, in some embodiments, the "augmented reality game" (game augmented computerized project management system/method) can be integrated with project management, learning management, content management and even human resources. Since creating such gamified systems can be resource intensive, often it is useful to create some standard gamified project management modules that can be reused between projects. Application Ser. No. 13/711,563 also taught that in some embodiments, one or more individual game designs (which can be optionally customized as needed) can utilize a library of models, templates, and existing games (e.g. prefabricated standardized modules), and the system managers can reduce setup time by adapting an existing (prefabricated) gamified project management module (file) for their particular project management and/or learning management requirements.

Application Ser. No. 13/711,563 defined an individual game is a Quest, where a Quest corresponds to a major business process or objective having Quests, corresponding to discrete projects, and each Quest has at least one Mission and each Mission has at least one Task. A scoring rubric permits individual players to be evaluated based on a set of criteria that may include quality criteria, in addition to other criteria. To clarify, and to reconcile the terminology used in Ser. No. 13/711,563 with more standard project management terminology, the following definitions may be useful:

Game: sum of all projects being managed by the system
Quest: an individual project, which may have various milestones (missions) and tasks
Each quest (project) may comprise one or more milestones (missions)
Each mission (milestone) may comprise one or more tasks To maintain the game-like aspects of the system, application Ser. No. 13/711,563 taught that the various team members (players) are evaluated according to a scoring scheme or rubric. Although some of the elements of a team members (players) score may be objective, some elements may be subjective. Further, some elements of a given team member (player) may be defined by other team members (other players) acting as individual evaluators. Some of these individual evaluators may be friends of the team member being scored, and some may be rivals. Thus for at least some scoring schemes, issues of individual evaluator bias must also be contended with.

As application Ser. No. 13/711,563 also taught, the credibility of individual evaluators may also be scored to adjust scores to increase fairness to players.

According to application Ser. No. 13/711,563, one or more managers can act as a Quest Master (project manager) they can edit or define a Quest (project) to define players (team members) and other selectable attributes of the Quest (project).

Employees (generally team members) play the game (use the gamified computerized project management system) and, as they do their various tasks assigned through the project management system, also earn scores that can be displayed (usually in computer user interfaces) in real time or on "leader boards", thus allowing different team members (players) to be ranked versus each other.

This ranking scheme adds the psychological benefits of game playing to conventional project management work processes. Again, to contrast with prior art project management systems, absent the invention, these work processes otherwise would have been handled by prior art project management tools that focused only on project schedule, scope and budget, and which otherwise failed to engage the interest of the users in a game like environment.

As previously discussed, prior art systems also generally either failed to provide learning management tools, or else separated the learning management tools from the project management systems.

As was further discussed in parent U.S. patent application Ser. No. 13/711,563, in one embodiment the invention may be viewed as a system (often a networked system with at least one web server, configured to communicate with various networked client devices) and method that generally will employ various computerized devices comprising at least one processor and associated memory. The invention also used a gamification engine (i.e. a gamified computerized project management system), here described in more detail in the present disclosure, to manage various business processes, including at least one project management processes.

Application Ser. No. 13/711,563's gamification engine (gamified computerized project management system) managed these processes as "augmented reality games" (gamified computerized project management system) in which members of an organization are selected to be players (team members) of games (various projects of interest to the organization) in which a quest corresponds to a major business process (e.g. a "task"), a mission (milestone) corresponds to a phase of a quest (task), and each mission (milestone) includes at least one task, and the "augmented reality game" is a gamified project management system that, in addition to standard project management system features, also includes various gamified features such as game scoring of tasks.

Put alternatively, the Ser. No. 13/711,563 disclosure taught generating a computerized "augmented reality game" (gamified computerized project management system) in which members of an organization are selected to be players (team members) of games (one or more projects) in which a quest (project) corresponds to a major business process including at least project management. Ser. No. 13/711,563 taught that a mission (milestone) corresponds to a phase of a quest (project), and each mission (milestone) generally includes at least one task.

One key factor that distinguishes the invention's gamified project management system from conventional project management systems is that the gamified project management system's "augmented reality game", in addition to standard project management functions, also includes a game-like scoring of how the various team members are doing as they implement their respective tasks, a method for introducing a measure of quality into project management systems.

A second distinguishing factor between the disclosure of parent application Ser. No. 13/711,563, and prior art is that application Ser. No. 13/711,563 teaches that some tasks may also include team member learning activities. In other words, application Ser. No. 13/711,563 extends the definition of business process to also include learning management. Put alternatively, both application Ser. No. 13/711,563 and the present disclosure are based on the concept that in addition to just getting work done, it is often very important to an organization to take steps to ensure that the various organizational workers (team members) are acquiring the skills to do the present task at hand, as well as hopefully more complex tasks in the future. Thus in contrast to standard computerized project management systems that tend to ignore worker training, the present invention embraces it and makes it another key project management element. The present invention further embraces methods for enhancing creativity as well.

Thus, just as conventional games allow players to both be ranked, and also acquire more skill as they progress, the present invention provides both a game-like element of player (team member) ranking, and also the game-like element of acquiring higher skills as time on the system increases.

When the disclosures of parent U.S. application Ser. No. 13/711,563 are viewed from a methods perspective, Ser. No. 13/711,563 teaches creating a new quest (project), assigning players (team members) to the quest (project), tracking of the status of participation (of various participants) in the quest (project), scoring players (project team members), and optionally also providing rewards and recognitions for players (team members). The "augmented reality game" (or gamified computerized project management system) can be further integrated with various project management, learning management, and content management software and systems as desired.

The system can also provide individual players (team members) with the option to selecting or rejecting tasks in a mission (project milestone). To facilitate scoring the various team members who have signed up for various individual missions (project milestones and tasks), these milestones or tasks can be assigned individual point counts. Team member progress with respect to these various tasks can be scored according to a scoring rubric (algorithm). This rubric or algorithm will generally include at least one criterion related to quality by which that team member performed that particular task. The results (i.e. the scores of tasks performed by the individual team members) can be calculated by the system's processor, and displayed on various computerized device user interfaces as leader boards that list various team members and the score assigned to each.

As previously discussed, in some embodiments, the invention's gamification engine (gamified computerized project management system) can also manage learning within an organization by having learning events managed as part of the "augmented reality game" tasks. That is, some tasks may be doing work for the organization, while other tasks may comprise having the team member learn something, and demonstrate measurable progress at leaning something.

In other embodiments, the gamification engine (gamified computerized project management system) can includes a quest (project) creation module, a quest assignment module (project team member assignment module), a quest (project) tracking and (team member) participation module, a quest scoring module (e.g. a module to score the number of game points awarded to various team members during the project), and a rewards and recognition module (e.g. a module to reward high scoring team members with various rewards, and to also publicize their success to other team members or other members of the organization).

To do this, as previously discussed, application Ser. No. 13/711,563 taught that often the gamified project management system will comprise a project management engine; a learning management engine; and a content management engine; and the augmented reality game (gamified project management system) can be integrated with project management, learning management, and content management.

As previously discussed, this gamified computerized project management system could further provide individual players with options for selecting or rejecting tasks in a mission (project milestone) with individual missions having individual point counts. The system can also provide user interfaces (often by network connections between a server and a user's network connected computerized device), for various authorized individuals, such as managers or consultants, to provide (enter) new quests (projects) into the system and/or manage existing quests (projects).

Again, application Ser. No. 13/711,563 also taught that often these various tasks will also include a scoring rubric, which will often include at least one criterion related to quality, such as quality of the work that that particular team member has performed, or proficiency at which that team member has learned some particular learning content. Again, the score results for the various team members/players can be calculated by the processor and gamified project management software, and it may then be displayed on various leader boards on the user interfaces of the various networked client devices. The goal and result is to provide a system that uses the "augmented reality game" to provide motivation for sociable business behaviors within an enterprise.

US parent patent application Ser. No. 13/711,563 further taught that to facilitate these methods; various gamification libraries to gamify various business processes can be generated. These gamification libraries can include templates and model quests, missions, tasks, and rubrics for scoring tasks, in which again, a quest corresponds to a major business process, a mission corresponds to a phase of a quest, and each mission includes at least one task. These various and templates can then be adapted to generate new gamified business processes, such as new quests. Some or all of these various library components can, as desired, be provided from third party sources.

Present Disclosure

The present disclosure builds on the basic concepts first articulated in parent U.S. patent application Ser. No. 13/711, 563, but now discusses these concepts in more detail. Additionally, further aspects of the gamified project management system are also discussed. To make it easier to distinguish the present gamified project management system concepts from prior art computerized project management concepts, the present specification will generally attempt, whenever possible, to more closely follow standard project management terminology.

In some embodiments, the invention may be a system and method (as well as software stored in computer readable memory) for operating a gamified computerized project management system configured to manage at least one project, each project comprising at least one task, at least some of these tasks requiring work product.

Figure 2:
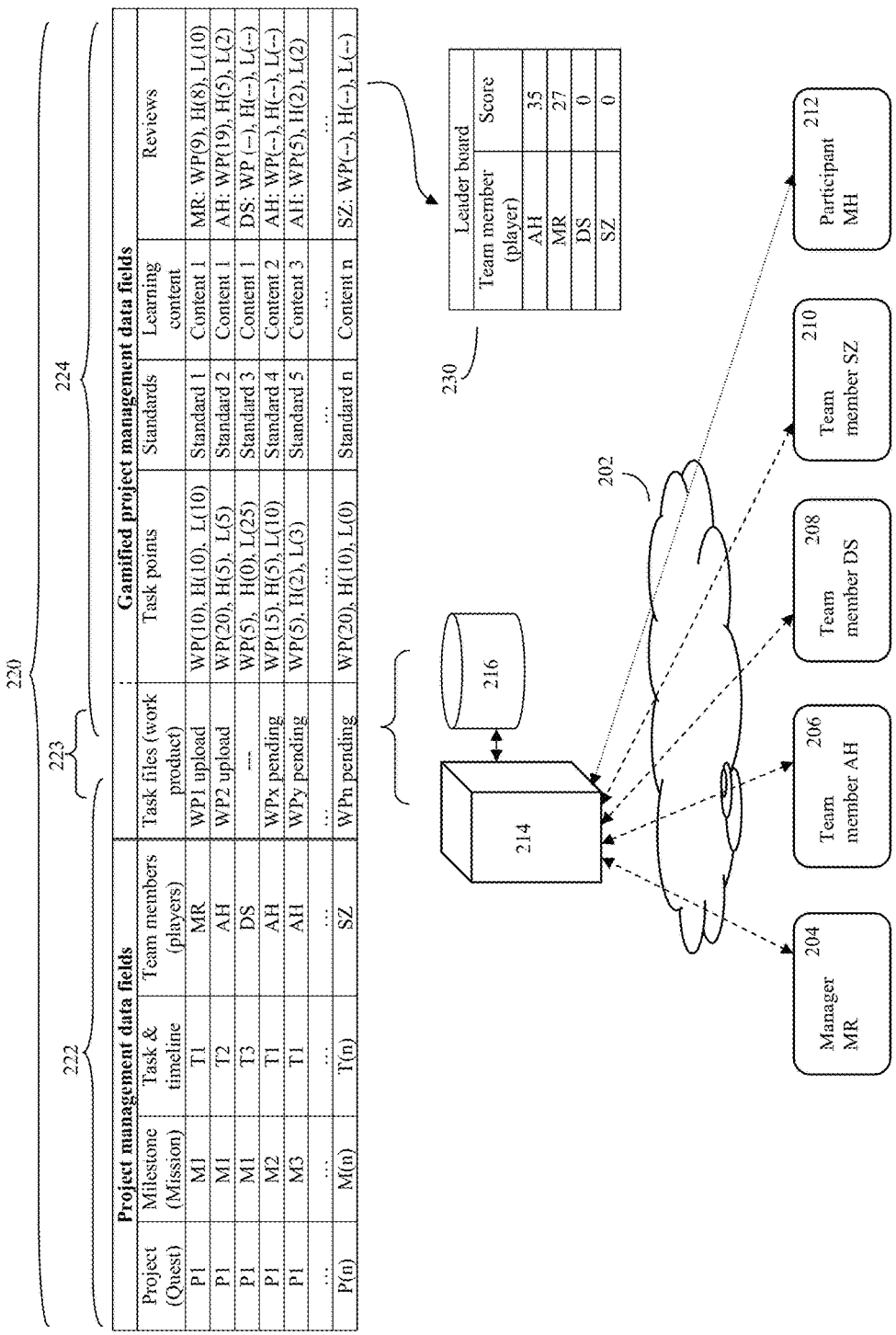
FIG. 2 shows an overview of a networked client-server embodiment of the invention's gamified project management system, showing how the invention's various gamified project management data fields can act to extend the data structures and functionality of prior art computerized project management systems, as well as to provide game like features such as providing team member scores, and providing an environment where a team member's skills can increase during a project.

As shown in FIG. 2, the gamified project management system (200) will generally run on a computer or computerized device (either a stand-alone computer, or a networked (202) system of multiple computers (204, 206, 208, 210, 212) and/or computerized devices, often with at least one server (214)). Each computer or computerized device (202, 204, 206, 208, 210, 212, 214) will generally comprise at least one processor (e.g. one or more microprocessors or microprocessor cores, often of the popular x86, ARM, or MIPS architecture, although other architectures and instruction sets may also be used) and associated memory. The gamified project management method will be implemented by gamified project management software (not shown) running on the at least one processor. In a preferred embodiment, the computer system will be a networked system (202) comprising a plurality of network connected computerized devices, each providing a network connected computer user interface (usually a graphical user interface) (204, 206, 208, 210, 212) for the various human participants.

In this context, FIGS. 3-12 should be considered to be screen shots of some of these user interfaces while running the invention's gamified project management software. Often the network (202) is the internet, although private networks may also be used. In some embodiments, server (214) will serve various project management web pages or app pages to the various user computerized devices (204 . . . 212), and here the various user computerized devices may simply interact with the invention's server by running various web browser or other apps as desired.

Generally, the human participants that will be using the invention's system and methods will comprise various actual or potential team members, and at least one manager. The at least one manager (204) may also be a team member, but the manager will generally have a higher level of privilege in the system, and may be granted a higher level of access to the system. In this particular example, for simplicity, each human will be considered to have their own individual computerized device, and the various users will interact with the system using their particular computerized device. Thus the human users and the devices will generally be designated by the same figure reference number. Thus when the specification refers to manager (204), this generally means that the manager is interacting with the system using computerized device (204).

FIG. 2 also shows a simplified representation of some of the various project management and gamified project management data and data structures (220) that will often be stored in the system memory (216), such as the server memory.

According to the invention, at least one user interface (generally running on a computerized device, such as a network connected computerized device) can be used to assign at least some participants to at least one task. This can be done either by the manager (using device 204), or as will be discussed by one or more participants (212) or team members (206 . . . 210) bidding or volunteering, or agreeing to accept a task. When this is done, these participants, which before were merely potential team members (212), are now considered to be team members (i.e. active team members), and are so designated by the computer system software (204 . . . 212).

This assignment process can be seen in data structure (220). For example, when team member AH (206) was assigned to task P1 (project 1), M1 (milestone 1), task (T2), this action was recorded in the Team members (players) memory by recording a link to AH.

Additionally, also generally using at least one user interface (although in principle this can also be done automatically), and generally by a manager (204) or other administrator with a higher level of privilege, usually a plurality of task points are also assigned to each task. Because of the importance of work product (or at least evidence of work product) to project management, generally if the task requires work product, at least some of the task points will be assigned to the work product. As will be discussed, however, task points can be assigned to other functions as well, such as helping other team members (i.e. teamwork), completion of various learning content provided by the system, and the like.

Additionally, according to the invention, at least one user interface can be used (often by a manager or reviewer) to assign various team member points to each team member for at least some actions, to be performed by the team member, that will be subsequently entered into the memory.

For example, a team member can be, in advance of any work, allocated 20 points for the work product, 5 points for helping teamwork (helping other team members), and 5 points for completing various types of learning content associated with the task. Generally the team member should be informed of this allocation in advance so that they understand the relative importance of the various parts of the task at hand.

This is also shown in FIG. 2. In FIG. 2, again looking at team member AH (206), for the task P1 (project 1), M1 (milestone 1), task (T2), the manager assigned both 20 work product (WP) task points, 5 Helping others points (H), and 5 learning points (L). This is designated by WP(20), H(5), L(5) in the example, and this would also be saved in memory data structure (220).

Although not all tasks will require that the given team member (task owner) assigned to that task provide at least evidence of the task's required completed work product, at least some of the tasks and actions taken by the system will require evidence of completed work product. Some tasks however may instead require only evidence of mastering the task associated learning content, and some tasks may require that the team member focus on providing assistance to other team members. Hence the "H" (for helping other team members) and "L" (for learning) in FIG. 2.

Figure 5:
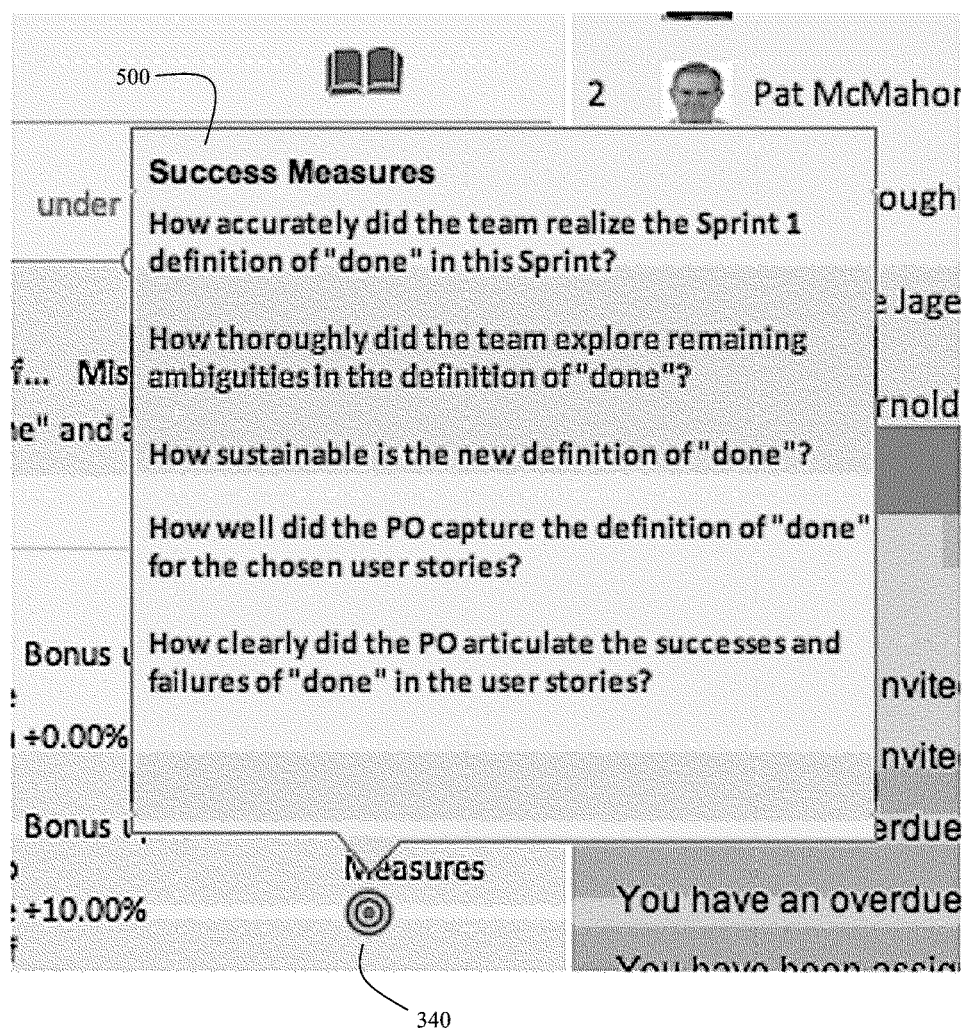
FIG. 5 shows one embodiment where by selecting the "Success measures" button shown on FIG. 3, a team member can obtain more information pertaining to the common set of standards used to communicate the desired state of the task, and optionally desired evidence of completed work product, upon task completion.

Generally after this allocation process, according to the invention, the gamified project management system is then used also distribute, to all team members, a common set of standards (generally written by the manager or other knowledgeable individuals) that communicate the desired state the task(s) and evidence of completed work product(s) (if any) to be provided by the responsible team member(s) upon task completion. (An example of such a set of common standards is shown in FIG. 5.) This helps insure that team members have a clear understanding of what task requirements will be reviewed and scored, and thus which are presumably most important. Here this is designated in FIG. 2 by the "Standards" data structure.

According to the invention, and generally after an identified team member has been officially assigned or linked to a task on the system, at least one user interface can then be used to enter that identified member's evidence of completed work product into the computer system's memory. This is designated in FIG. 2 by the Task files (work product) data structure.

This evidence of completed work product can take on many forms. Note also that although often the identified team member will enter this evidence of completed work product themselves into the computer system's memory (e.g. team member AH will upload his own "WP1 delivered" files or other data using his device (206)), it should be evident that this evidence of completed work product can be entered in by another team member, by the manager, or by other designated method.

If the work product required is in the form of a document, video, program code, or other computer uploadable file, then the evidence of completed work product can be an uploaded file containing the work product, or at least evidence of the work product. If the work product is not inherently uploadable (perhaps it is a tangible material or intangible action, for example), then alternative evidence of the completed work product—e.g. photographic evidence, testimonial documents, or other proof of completion may instead be uploaded into the system memory.

The invention's systems and methods will then retrieve this evidence of completed work product from memory, provide the evidence to at least one reviewer (usually a human reviewer, although in some embodiments, automated review may also be done) to review this evidence of completed work product against the common set of standards for that work product, and then enter this completed work product review for that identified team member into memory. If one or more human reviewers are used, as will often be the case, this will be done using at least one user interface. If the review is automated, then no user interface may be required. This step can be done for each reviewer and each review. An example of a reviewer interface can be seen in FIG. 7.

In the FIG. 2 example, team member AH's "WP2 upload" might be a document that AH uploaded from device (206). If team member DS is acting as reviewer, DS might then download document WP2, onto device (208), review it, give feedback on at least the work product content, and transmit this feedback back to server (214) where it can be stored as part of the AH's review data in the reviews portion of data structure (220).

Since, in some embodiments, the invention may be viewed as a gamified extension of standard project management systems, any and all standard project management tasks may also be done according to the invention. In addition to standard project management functionality, other actions can also be done within the gamified project management system include team member acceptance of tasks, team member or manager or other individual uploading information for tasks, reviewer rating of tasks, communicating with team members about tasks, consulting or providing learning resources about tasks, and input related to advancing the state of a task toward completion.

As previously discussed, in some embodiments, at least some task points may also be associated with other (non-work product) actions, and information regarding points allocated to the other actions, and information pertaining to these other actions, may also be provided using the user interfaces (204 . . . 212). In these embodiments, the user interface can also be used to enter an identified team member's evidence of completion of these other actions into system memory as well. For example, if team member AH (206) helped team member MR (204) with his task, team member MR might reward team member AH by using MR's device (204) to allocate team member AH additional helping (H) points by way of network (202) and server (214) and memory (216). This would also be saved in data structure (220). In this example, team member AH has been allocated 5 additional teamwork "helping" points (H).

In some embodiments, to help balance the project when one team member may unexpectedly have to help another team member more than previously expected, the system may be further configured to allow a first team member or a manager to use their device's user interface to transfer either the first team member's team member points or the first team member's task work product points to a second team member. Thus for example if a first team member falls ill, and the second team member works late to help meet a task deadline, the second team member can be rewarded appropriately. This also helps create an environment where team members are further rewarded for helping each other.

To provide a "score" or other feedback to the various team members, the gamified project management software can further comprise one or more feedback algorithms or "rubrics" that are designed or configured to use the various score results for each identified team member, generate at least task work product points for the successful completion of that task's assigned work product (if any) (and often points for other actions such as learning, helping other team members, etc. as well), and store at least these task product work points, and other points as appropriate, in memory in a manner that allows these points to be linked to that particular identified team member. This can often be reported as "leader boards", such as the "Player Scores and Inventory" board shown in FIG. 9.

FIG. 2 shows an extremely simple algorithm or rubric, which simply adds up all review points of any type assigned to a given team member. Using AH again as an example, so far AH has been given, for task P1, M1, T2, 19 work product points WP(19), 5 helping points H(5) and 2 learning points (L2). Additionally, for task P2, M3, T1, AH has also been given 5 work product points WP(5), 2 helping points H(2), and 2 learning points L(2). Using the simple "sum up all of the points" rubric, then AH has so far won a total of 35 points.

By contrast, next runner up, manager/team member MR, has only been given, for task P1, M1, T1, 9 work product points WP(9), 8 helping points H(8), and 10 learning points L(10). So MR has only won 27 points to date. The other team members DS and SZ have not been awarded any points yet.

According to the invention's method, the at least one processor and the gamified project management software can then be used to automatically provide, generally on multiple team member user interfaces (so that other team members can see where they fall in the comparative rankings) "leader board" (230) type information pertaining to the various team members their relative rankings. This information will be obtained at least in part from their task work product points, and (so that relative rankings can be seen) will also include at least some information that varies at least according to the task work product points associated with other identified team members (it will generally also vary according to other factors such as the previously discussed teamwork and learning activities). This approach thus allows normal project management activities to be done, while at the same time also creating a game-like competition between different team members.

Again, turning to FIG. 2 for a more specific example, here the rubric or algorithm sums up all points, and not just work product points. Thus as previously discussed, the processor and system software can use this information to construct a leader board data structure (230), that can summarize the total number of points given to each team member, and also rank the various team members according to their total score. Here we see that team member is in the lead with 35 total points so far, team member MR is second with 27 total points, and DS and SZ are tied for last with 0 points each so far.

Running Multiple Games During the Course of a Project

Although sometimes the leader board and member evaluation process can run from the beginning of the project on out forever, sometimes it will be useful to reset the results on a periodic basis, such as daily, weekly, monthly, quarterly, yearly, or on some other basis, such as the completion of a project/quest. This can reset things so that team members that have gotten too far behind can get a chance to catch up next period. Thus according to the invention, in these embodiments, the at least one processor and gamified project management software can be used to periodically calculate at least one: 1) the total high scores for a given period; 2) the total overall high scores throughout a plurality of periods; and/or 3) the highest score for any task completed during a given period.

More specifically, when in essence the "game" is restarting at periodic intervals during the course of a project, according to the invention, this can be done by the steps of: 1) periodically assigning a plurality of task points to each task, and 2) periodically assigning a plurality of team member points to each team member. Here the rule that the system will often be programmed to automatically enforce is that the sum of the number of team member points expended per task by the various team members assigned to that task should be equal to the number of task points.

Put alternatively, and looking at these points from a person hour perspective, if a task requires 30 task points (hours) to do, then the number of team member points allocated to the project, across the various team members, should also be 30 hours.

In this embodiment, the steps of assigning a team member to a task will generally further comprise using at least one processor and the gamified project management software to require that the team member may never have a negative remaining number of team member points. Again put alternatively, if a team member has dedicated 40 hours per week to work (40 points), then at least nominally (absent overrides), once these 40 hours have been dedicated to various projects, than that team member should have zero points remaining, and should not have his or her team member points allocated to any additional projects.

Thus, as a team member's team member points are allocated to various projects, for those team members who still have a positive remaining number of team points, when points from the team member are allocated to a task, the system will automatically deduct at least some task points from the team member's remaining team member points, and credit these debited task points towards meeting the number of task points assigned to that task. It of course should be clear that if the game is going to run multiple times during the course of a project, then the above process of periodically assigning points will also happen at least one time during the course of a project.

Other Scoring Features:

In some embodiments, the system software and processor can be configured to automatically reward high-scoring participants (team members). Alternatively this can be done manually, such as by the manager using device (204). An example of such a high score rewards interface can be seen in FIG. 11.

In addition to giving numeric scores, other non-numeric methods of showing the lead may be used. In some embodiments scores may not be shown directly, but simply relative positions. Alternatively letter scores or other symbols (e.g. crown symbols, turkey symbols, etc.) may be granted. Any and all methods of conveying relative team member ranking are contemplated according to the invention.

To generalize then, in some embodiments, the process of scoring each identified team member's success at completing their assigned task further can further comprises determining task successful identified team members, and crediting each identified task successful team member with team member task credits for successfully completing that assigned task. Here these identified team member task credits will be assigned according to the number of team member points previously assigned to that identified team member's assigned task. Thus, for example, if a task was assigned say 20 work product credits for successful completion, then the maximum number of work product points that a given team member can be given for doing a perfect job must be 20 or less.

In some cases more sophisticated evaluation algorithms or rubrics may be used. In another embodiment, the algorithm/rubric may be based upon any of: 1) the value accorded to each success measure by each reviewer; 2) the total point value available for each task: 3) the importance of the task to the project as a whole, and the relative consistency of ratings by individual reviewers. Here point 3 addresses the issue of inconsistency between reviewers. If a given reviewer tends to evaluate either high or low, their vote may be automatically normalized or adjusted by the system. Similarly if there is a history of reviewer bias towards one or more team members, the reviewer ratings may also be automatically normalized or adjusted by the system. The main goal is to take automatic steps to insure fairness and consistency. This type of scheme can help even a struggling worker to find motivation to work harder.

In some embodiments, the algorithm can also include factors such as the importance of each success measure; the number of tasks completed; the timeliness of completion; and the available bonus points accorded to the chosen option or earned through project-participation/game-play.

Figure 8:
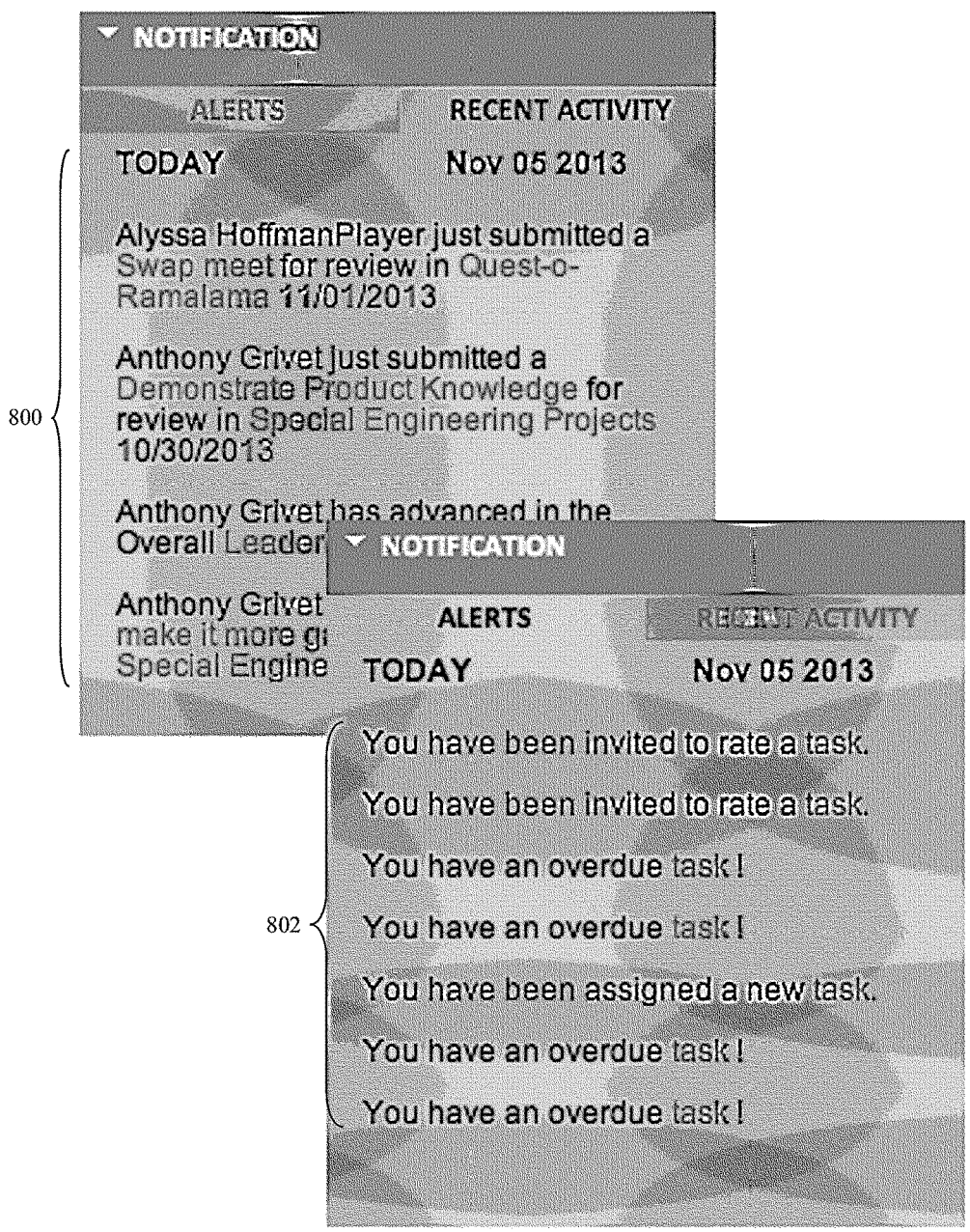
FIG. 8 shows a detail of the team member user interface where team members (players) can be notified about recent activities in that team member's particular projects (Quests), as well as alerting the team members to new tasks, review assignments, or project deadlines.

The system can also perform more standard project management tasks. For example, the system may present notifications to all project team members of at least on of: other team members accepting tasks, other team members completing tasks, other team members receiving points for completed tasks, and the inception of a new project. An example of such an interface is shown in FIG. 8.

Although in the previous example, an embodiment where the manager (204) assigns various participants to specific tasks, other methods assigning participants to tasks is also possible. In some embodiments, participants (or team members) can request that they be assigned to a task by using their user interface to transmit a task bid to either the manager (204) or with proper authorization these participants or team members may be automatically assigned as well.

Since any participant or team member will generally only have a limited amount of time or resources to devote to any given task during any period of time, often this task bid may include a proposed number of team member points that the bidder proposes to allocate to that task. For example, say each team member point corresponds to one hour's worth of time during a week, an interested bidder might propose to devote 30 hours (e.g. points) to a given task. In this case, if the bid is accepted (either automatically or with manager involvement/approval), that participant would be designated a team member for that particular project, and their proposed number of team member points would be stored in data structure (220). This number of points can then be used (assigned to this team member) for subsequent actions to be performed by that team member.

Thus, for example, returning to FIG. 2, if team member AH had bid 30 hours/points for task P1, M1, T2, then these 30 points can then be distributed (either automatically, or by the manager or other authorized person) into the various work product (WP), helping other team member (H), and learning (L) points as previously discussed, resulting in the task points allocation of WP(20), H(5), L(5) allocation seen in the task points column of date a structure (220). If team member AH had bid only 10 hours/points for task P1, M3, T1, then there would only be 10 points to distribute among the work product (WP), helping (H), and learning (L) task points. This is why for task P1, M3, T1, AH has only been allocated Task points of WP(5), H(2), L(3).

To further encourage team members to help other team members, other incentives may also be implemented. In some embodiments, the system may be further configured to provide team members with another type of scoring mechanism here termed "discretionary points". The overall concept here is not unlike the idea of distributing gold coins during a game, to be used for various in-game purchases.

These discretionary points can be awarded or provided to various team members according to a gamified project management software algorithm run that, for example, credits the team members for mentoring other team members. Team members can then use their discretionary points to acquire discretionary point purchasable resources, alternatively or to trade with other team members to help further cooperation.

Not all tasks need to be performed to the highest extent. Often it is the case that for a given task, there may be a range of possible options. There may be a minimum acceptable degree of completion, a preferred degree of completion, and possibly an "exceeds expectations but welcome" degree of completion. Depending on time and resources, it may be advantageous to an organization to allow some tasks to be completed at a more minimal level in order to allow all needed tasks to be completed, or to allow some selected tasks to be done extremely well.

As a result, in another embodiment that is particularly relevant when team members/participants are bidding for various tasks, it is often useful, for at least some tasks, to provide multiple task options with a differing number of task points assigned to each the task option. In these embodiments, then either a participant or team member can then use their device user interface to request assignment to a specific task option. Thus a team member with extra time or resources can request a more ambitious and higher scoring task option, while a team member with less time or resources can select a more limited and lower scoring task option. An example of such multiple task options can be seen in FIG. 3 (338).

Sometimes it is also useful to report other information as well, such as the degree to which various team members assigned to a task view that task as going well. This, sometimes subjectively determined "task status" assessment, although informal, can help managers and team members rapidly see if a task is going well nor not.

To do this, in some embodiments of the invention, the various team members assigned to a task may further use their user interfaces to transmit team member task status information. This task status information is generally that team member's personal assessment of the status of the task (task status), such as if that task is going as expected, or is encountering problems. When multiple team members are assigned to a task, this team member provided task status information may be aggregated across all team members assigned to a given task (often using data structure (220), and reported as a composite value in a task status portion of the various user interfaces. This task status information can be a color indicator (e.g. green, yellow, red), numeric indicator, one or more emoticons (smiley face, neutral face, frowning face, etc.), and the like. An example of such a task status information interface can be seen in FIGS. 3 (344) and (346).

As previously discussed, the invention is also based, in part, on the insight that to provide a sense of continual skill advancement, it is often also useful to configure the gamified project management system to provide at least some learning content materials. To encourage team member/players to improve their skills, their progress in mastering these learning content materials can also be scored and evaluated, and incorporated along with work product and helping others (teamwork) into that team member/player's overall score. The record of various team members skills and skill advancements can also be useful to an organization in other areas as well, such as allowing an organization to map where its various members have good skills, and where the organization's members have skill deficiencies, which might in turn be remedied by either further hiring, further training, or both.

Thus in some embodiments of the invention, at least some of the tasks may further comprise learning content. This learning content can be learning media, such as instructional videos, audio recordings, documents to read, and the like, and this can be supplemented by appropriate computer scored tests (e.g. true false tests, multiple choice tests, computer read essays) or by human graded tests as desired. Alternatively the learning content may include directions to attend certain classes or seminars, and the like. This learning content is typically stored in system memory, often stored in or linked to by data structure (220). It is often provided to the various team members by the invention's gamified project management system using, usually via the team member's computerized device user interface. Usually the system will also store a record of a particular team member's accessing and successfully mastering this learning content in memory as well, such as data structure (220). If the learning content includes automatically graded tests, then the test results can be used to automatically determine a team member's learning score points "L" for that particular member. An example of various types of learning content can be seen in FIG. 6.

Different team members will have different levels of ability. Often, to further build team member skills, the system records of a particular team member's accessing and successfully mastering certain types of learning content can be used by the system to automatically reveal, on the team members device user interface, additional or subsequent (often more advanced) tasks with additional learning content.

Occasionally team members may become "stuck" on their tasks, and need additional input from other sources. To help cope with this type of problem, in some embodiments, the system may also be configured to provide a task problem input (i.e. a help button) on the user interface. This task problem input can then be used by the team member to notify a manager, another team member, or a consultant that the team member needs additional help or input on a problem. This type of help button can be seen in FIG. 9 (900).

One problem, however, is that a manager with a lot of team members may become bombarded with too many help requests at the same time, and be unable to easily see which requests are most urgent. To help sort these help requests in the order of priority, in some embodiments, the system may additionally be configured to require the manager, often in advance of the help request, to rank a task according to the tasks importance or urgency to the organization. This ranking can be done numerically, as well as by optional text, audio, or video commentary. These rankings or ratings can then be used as input to a prioritization algorithm to rank a given task problem (help request), relative to other task problems (help request); on the user interface whatever manager, team member, or consultant is being notified about the problem. This way more urgent help requests will hopefully be addressed sooner.

Another unique aspect of the invention is that it accumulates a detailed project history record of team member interactions and changes in skill set during one or more projects, as well unusually detailed input regarding task specifications and team member progress at meeting these task specifications, and other factors (e.g. accumulating additional experiences such as team member subjective opinions about task progress). This project history record can help the organization learn from experience, and identify ways to improve on future projects. Thus to save this project history information, and make it available for future reference, in some embodiments the invention will be configured to time stamp and record this information at a high degree of resolution.

In some embodiments, the invention may further have a collaboration system that also records communications such as instant messaging (IM), various document versions, and various decisions made, and so on, and then associates these communications with specific tasks. This can speed up collaboration, because (for example) team members don't have to scurry through their email to try to find the discussions about various decisions.

In particular, in some embodiments, each change in any of the projects, project tasks, task points, participants, team members, team member task assignment, team member points, scoring of team member success at competing the team member's assigned task, and team member task credits is stored in computer memory (such as data structure (222). Often these changes will be stored along with a time and date stamp of the time and date that the particular change occurred. In some embodiments, it may also be useful to store this information sorted by task, mission/milestone, and quest/project as well. This, in combination with suitable data storage and retrieval mechanisms, allows a detailed record of the project history to be subsequently retrieved and analyzed.

In some embodiments, it is useful to further configure the gamified project management software with an ability to not only read and write gamified project management system files (e.g. read and write data structures such as (220) to non-volatile memory, but also to translate between different project management formats.

As can be seen in FIG. 2 data structure (220), can be viewed as comprising both a set of standard project management data fields (222), and a set of gamified project management data fields (224). Additionally, some data fields, such as uploaded task files (work product) (223) might be viewed as being in either category. Thus in rough overview, legacy computerized project management system files can be viewed as consisting of portion (222) of the gamified project management data field (220). Thus in essence, converting legacy computerized project management system files to gamified project management data files (220) consists of using the legacy project management data to populate portion (222) of data file (220), and then adding the missing gamified project management data. Conversely the process of converting gamified project management system files such as data field (220) to legacy project management data files consists of using the project management data field data (222) to populate the data fields in the legacy project management data file format. In doing so, of course, by necessity the content of gamified project management data fields (224) will generally not show up in the translation.

Thus for example, to convert legacy computerized project management system files to gamified project management system files, the invention can operate by parsing the legacy computerized project management system files into projects data fields, task data fields, participant data fields, and team member data fields (these last two may be the same). Then for each task in the project, the system can link the task data fields (content in 222) to task point data fields (content in 224), thus providing gamified task data fields. Further for each team member in the project, the system can linking the team member data fields (content in 222) to team member point data fields (content in 224) and team member score results fields (reviews field content in 224), thus providing gamified team member data fields (content in 224). Also further providing additional gamified project management data fields (such as the standards and learning content data fields in 224). The system can then store these projects data fields, gamified task data fields, gamified team member data fields, and additional gamified project management data fields in computer memory as gamified project management system files (e.g. data files now creating data structure 220).

Because gamified project management files (e.g. data structure 220) are generally a superset of legacy project management system files, conversion can be relatively simple. The system can do this by stripping out the extra gamified data (224), and putting the remaining gamified project management data into the legacy project management system file format.

More specifically, the conversion of gamified project management system files to legacy computerized project management system files can be done by parsing the gamified computerized project management system files (e.g. data structure 220) into projects data fields, gamified task data fields, and gamified team member data fields. Then for each gamified task in the project, the system can delinking the gamified task data fields (data in section 222) from the task point data fields (data in section 224), thus providing legacy task data fields. Further, for each gamified team member in the project (data in section 222), delinking the gamified team member data fields (data in 222) from gamified team member point data fields (data in 224) and gamified team member score results data fields (data in 224), thus providing legacy team member data fields. Further using the system to remove additional gamified project management data fields (such as the standards and learning content data fields). The system can then store at least the projects data fields, legacy task data fields, and legacy team member data fields in computer memory as legacy project management system files.

This method thus allows the invention to export data to legacy project management systems as needed.

Having now given an overview of the system, let us now turn to FIGS. 3-12 for some more specific examples of the system in operation.

Figure 3:
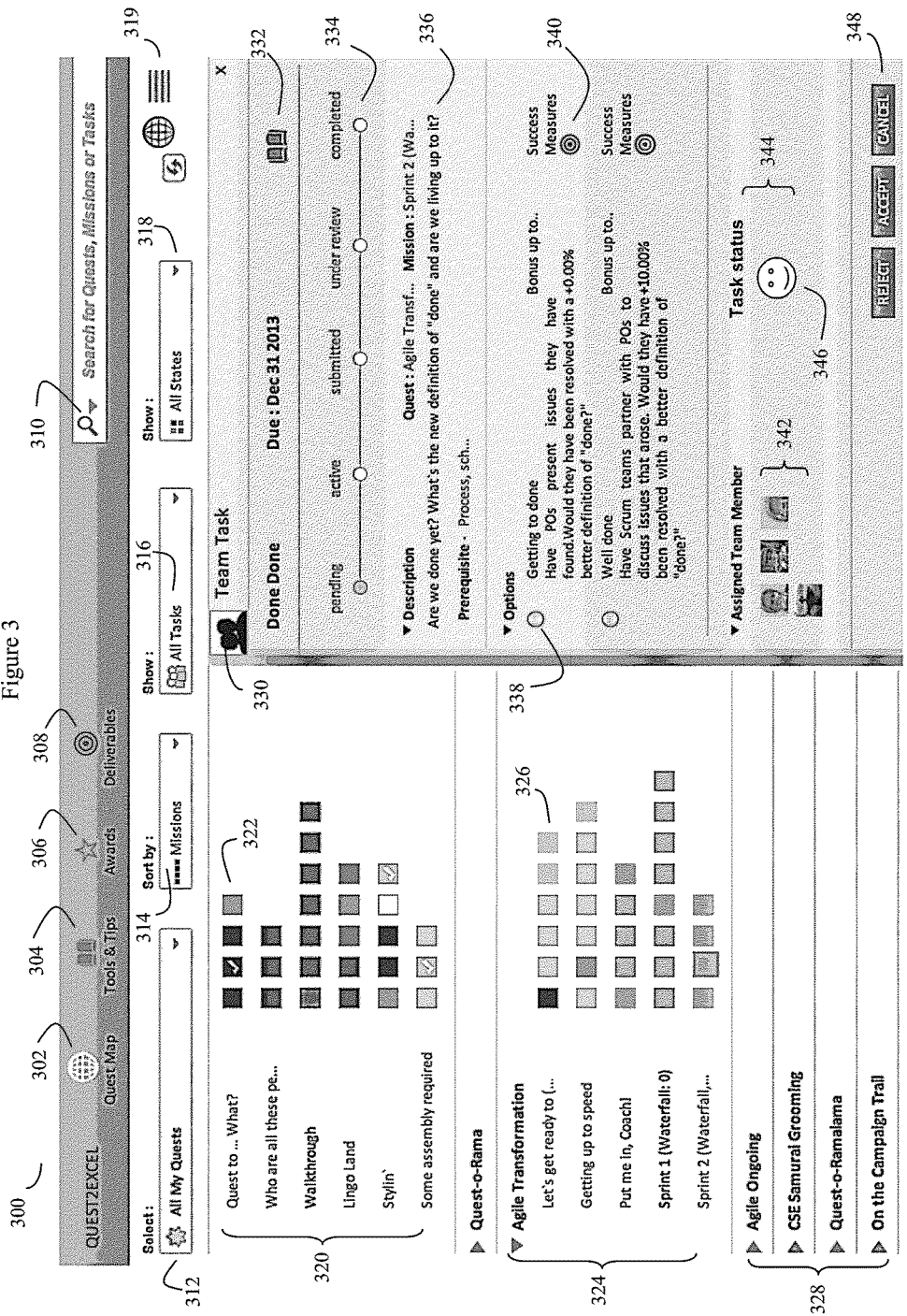
FIG. 3 shows an overview showing a computerized device user interface displaying where project team members can view various project tasks. In this embodiment, team members (players) can choose options, find out information pertaining to task standards, accept tasks or bid on tasks, and find relevant learning content. Team members may also use this interface to communicate with other team members.

FIG. 3 shows an overview showing a computerized device (for example for team member AH using device 206) user interface can display (300) various project tasks for a particular team member. The display user interface, which may out from a web browser, app, directly from the gamified project manager program software shows various elements. Some of these elements include a link to an overall Quest (project map) (302), access to overall project tools and tips information (304), link to that particular player/team-members discretionary point based awards (306), and a link where a player/team-member can upload deliverables, such as completed work product files, or at least enter in evidence of completed work product.

Quest map (302) is somewhat like a "home" button, in that it takes the user up to the highest level view of the various projects/quests, missions/milestones, and tasks that the user is authorized to see. Once at the higher level, the user can then search and drill down to the appropriate project/quest, mission/milestone, and task that the user is interested in examining in more detail.

The player/team member can also search for other quests (projects), missions (milestones) or tasks using search box (310). In this particular example, the player/team-member has set the interface (312) selector to display an overview of all of his quests/projects, and he has further requested (314) that these quests/projects be sorted by missions, and (316) that the display shows all tasks in (318) all states of development. So FIG. 3 (300) is giving player/team-member AH a fairly high level overview of everything that is going on in the organization that this player is involved with.

Thus in general, the various players/team-members, and mangers can use this type of interface (here shown as drop down menus (314), (316), (318) and (319)) to sort tasks so that they are viewable by player-team member, state of task, quest/project, and so on. Alternatively this information can be presented as a list, rather than graphically. See FIG. 10 to see the results of an alternative sort selection.

In FIG. 3 (320), the various Quest/projects are displayed, and the user can also see which particular quests/projects and which particular project missions/milestones that this player/team-member is involved with, because these particular boxes in (322) are checked. Interface elements (320) shows the details of any project or quest in which the user is participating, various quest/project missions/milestones are shown in (324), and some specific tasks and level of completion of the task are shown in (326). This is also discussed in more detail in FIG. 4.

Tasks are an important building block of the system. In panel (330), players/team-members can perform various functions, such as choosing one of potentially multiple task options (338), some of which will be associated with differing number of task points. Here the player/team-member can also select one or more "Success Measures" links (340) to find out more information about the common set of standards that communicate the desired state of at least that task upon completion. The player/team-member can also click on (332) to access task related learning content or other relevant learning resources. Team members currently assigned to the task or project's team are shown in (342), the overall progress of the task is shown in (334), along with a brief description of the task in (336). The composite value of the various team members' assessment of the task status is shown in (344), and here this is more specifically visualized as "smiley face" emoticon (346).

The player/team-member is often given a chance to accept, reject, or cancel assignment or input to a given task, and record this by clicking on reject/accept/cancel interface elements (348).

Thus at the task level (300), much communication between users may occur. This is because it much collaboration between users generally happens through tasks, and linking this user communication to these specific tasks keeps the organization keep a better record of business activity, decision-making, team member performance, and the like.

Thus to summarize, in FIG. 3 (300) the interface team members (players) can choose options, find out information pertaining to task standards, accept tasks or bid on tasks, and find relevant learning content. Team members may also use this interface to communicate with other team members.

FIG. 4 shows more detail of the project or "Quest" portion of the user interface, previously shown in FIG. 3. Team members can use this interface to accept or bid on one or more tasks, as well as to track their progress according to various task milestones. Here a particular quest/project (400) is further broken down into that quest/project's missions/milestones (328), and the various tasks in a particular mission/milestone are further shown as (326). In some embodiments, to facilitate ease of system management, new quests can also be created by the manager or other authorized user by, for example, mixing and assembling building blocks of previously generated quests, missions and tasks to create new quests.

Thus player/team-member bidding to participate in specific tasks may, for example, start at interface (320). Generally, as discussed elsewhere, some or all tasks in a project/quest can be bid on by players/team-members at a price that may, in part, be determined by the skill level of that particular participant/player/team-member.

Success measures—that is the "common set of standards that communicate the ideal state of the task and required work product or evidence of completed work product upon task completion"; are another important element of the invention. These success measures articulate the ideal end state of the work product (or evidence of completed work product), and as discussed elsewhere are used to reward players/team-members for more desirable work product outcomes.

FIG. 5 shows (500) shows a detail of the success measures used for a given task. Here, the player/team member has clicked on the success measures button (340), which tells the system to display these success measures (500).

In some embodiments, these success measures (common set of standards) can also be used for other functions as well. For example, in some embodiments, these success measures/common set of standards can also be used, in conjunction with project history files, to also evaluate the individual or group (workforce) talent, knowledge skills and abilities. This can provide organizations with insights as to how to allocate resources, make strategic decisions, and hire more intelligently.

Here, for example, an individual's scored achievements in various success measures can also become a significant tool in the assessment of that individual's knowledge, skills and abilities. This can be used both for providing appropriate tasks and learning, and also for developing a more complete picture of the capabilities of any individual within the organization. When the sum of all the organization's individuals (i.e. the organization's staff or total workforce) it taken together, the various ratings on the various success measures can provide concrete data regarding an organization's actual capacity (from a staffing or workforce standpoint) to realize various types of efforts.

By storing these various scores in memory, a profile of the knowledge, skills, and abilities of the team members and teams can be preserved for subsequent analysis. Thus by selecting the "Success measures" button shown (340) also shown on FIG. 3, a team member can obtain more information pertaining to the common set of standards used to communicate the desired state of the task, and optionally desired evidence of completed work product, upon task completion.

FIG. 6 shows one embodiment where by selecting the "Tool & Tips" (322) icon (also shown on FIG. 3), a team member can access learning content (600) appropriate to that team member's tasks. This learning content can be many types of content, including web based content, original content, text, videos, talks, and the like. The system can also be configured to test the team member's proficiency at learning the provided learning content, and use this information to determine when more sophisticated learning content should be provided.

FIG. 7 shows a detail of the user interface where a team member's performance on a given task (here evidence of completed work in the form of a deliverable work file has been uploaded) can be reviewed by one or more reviewers (who can be other team members, managers, etc.). In this example, the evidence of completed work from team member (player) Pat McMahon (706) is being reviewed by another team member (player) Andy Hoffman (710), based on the "common set of standards"/success measures (704). Andy is entering his score or evaluation of the various success measure criteria by selecting various sliders (708). The Pat's score results (raw score data 708), entered by Andy in this example, is then run through the previously discussed algorithm/rubric, task work product points computed, and this in turn is used to produce at least some information (i.e. a composite score) that varies according to these task work product points in the leader board. The reviewer (player/team-member Andy) can also add other comments (710) as desired.

Note that while the system will generally awards at least some points for almost every player/team-member action, to encourage productivity, the preponderance the points used for the leader board rating will generally be obtained from work product evaluations such as these.

FIG. 8 shows a detail of the team member user interface where team members (players) can be notified (800) about recent activities in that team member's particular projects (Quests), as well as alerting the team members (802) to new tasks, review assignments, or project deadlines.

Figure 9:
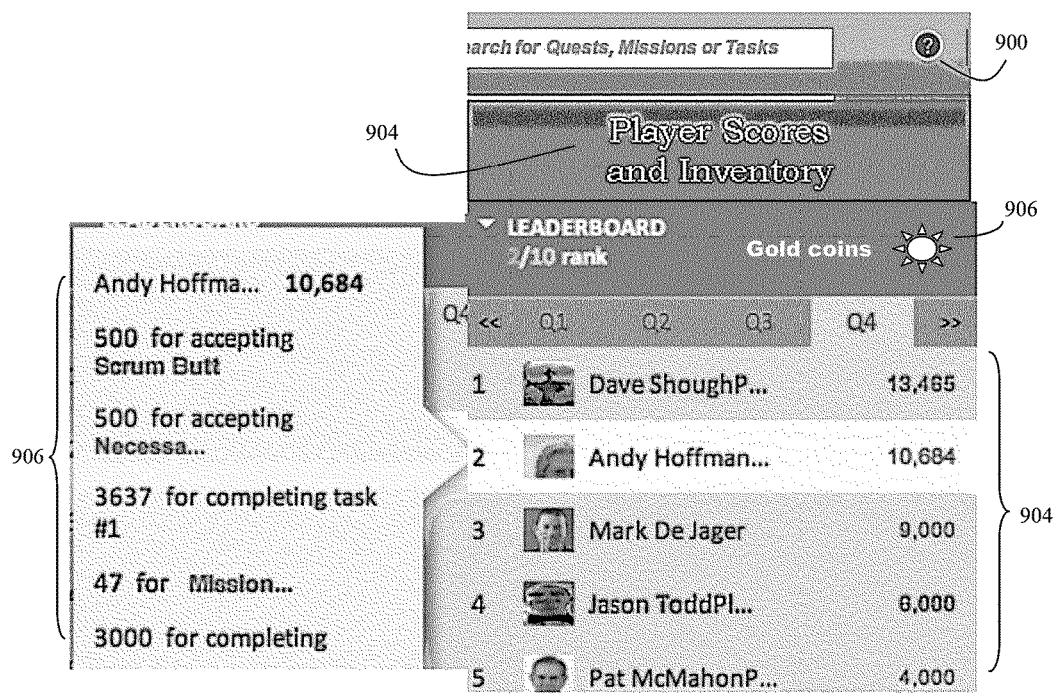
FIG. 9 shows a detail of the "leader board" section of the team member user interface, showing how the system can provide the various team members information regarding both how many points that team member has accumulated (from task work product points and other types of points), as well as information regarding the number of points accumulated by other team members, thus showing the relative ranking of the various team members. Here team member Dave Shough is presently in the lead.

FIG. 9 shows a detail of the "leader board" section of the team member user interface. This provides at least some information to team members regarding their task work products, as well as at least some information that varies at least according to the task work products associated with other team members.

Here the leader board "Player Scores and Inventory" (904) section is showing how the system can provide the various team members information regarding both how many points that team member has accumulated (from task work product points and other types of points), as well as information regarding the number of points accumulated by other team members, thus showing the relative ranking of the various team members. Here team member Dave Shough is presently in the lead with 13,465 points, while Andy second with 10,684 points. By clicking on his score (906), Andy can see exactly what he did to earn his leader board points, and how much credit came from which activity.

Other elements of FIG. 9 include a help button (900) that can be used to reach various human experts and mentors.

Figure 11:
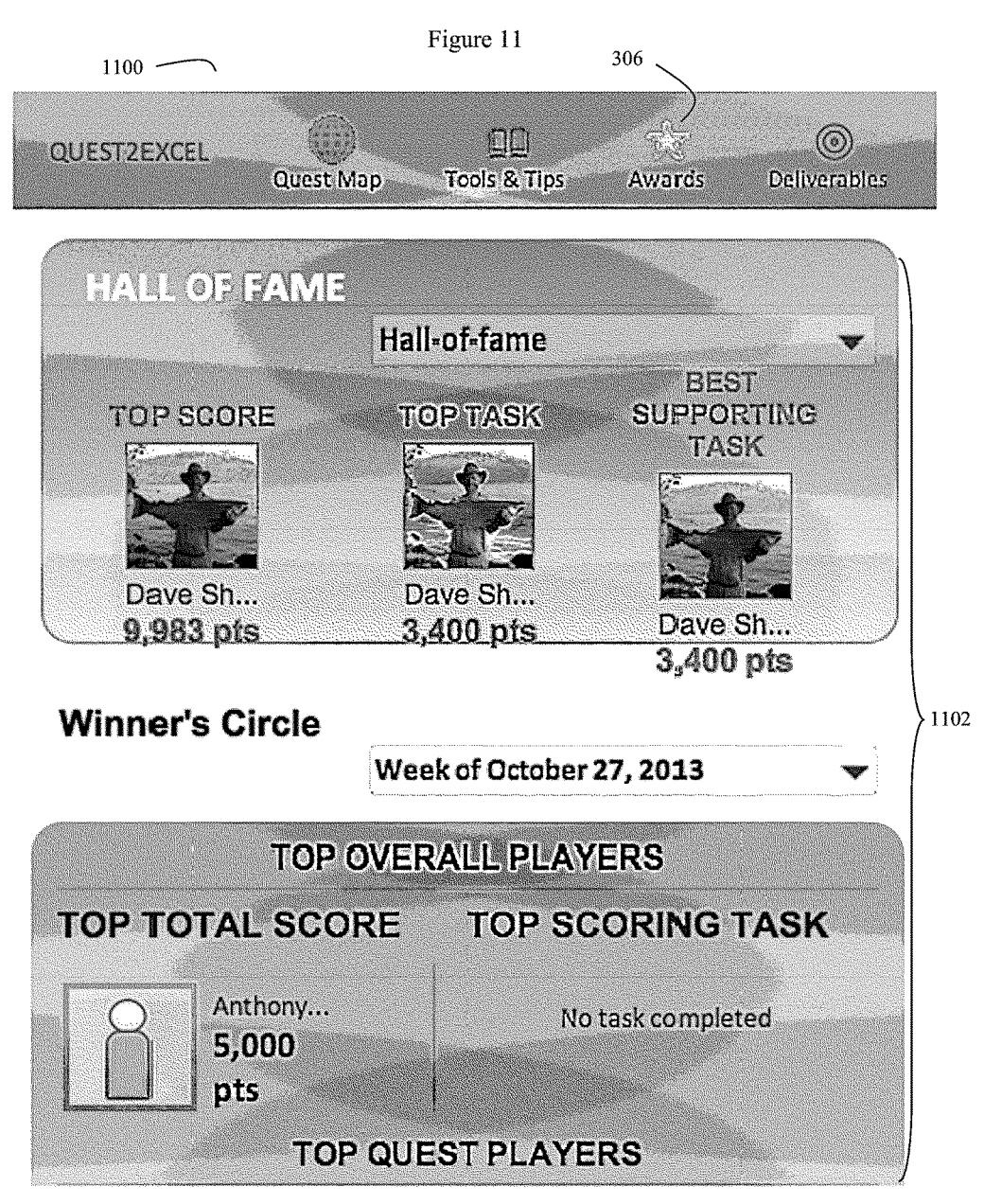

As previously discussed, in some embodiments, shown in more detail in FIG. 11, at least certain types of team member points may also be used as the basis to award discretionary points. In game terms, discretionary points can be viewed somewhat like "gold coins", or "chips", in that they are a form of in-game (here project management participation) reward. These discretionary points may be used by the team member to acquire various discretionary point purchasable resources, or to trade with other team members. What points are used for rewards may vary. When productivity is desired, work product points may be given more credit towards discretionary points. When more team work and more team member helping for other team members is desired, discretionary points may be based more on points awarded for assisting other team members. Here a player/team member may click on a suitable icon (908) to view and redeem his discretionary points (here called "gold coins").

Figure 10:
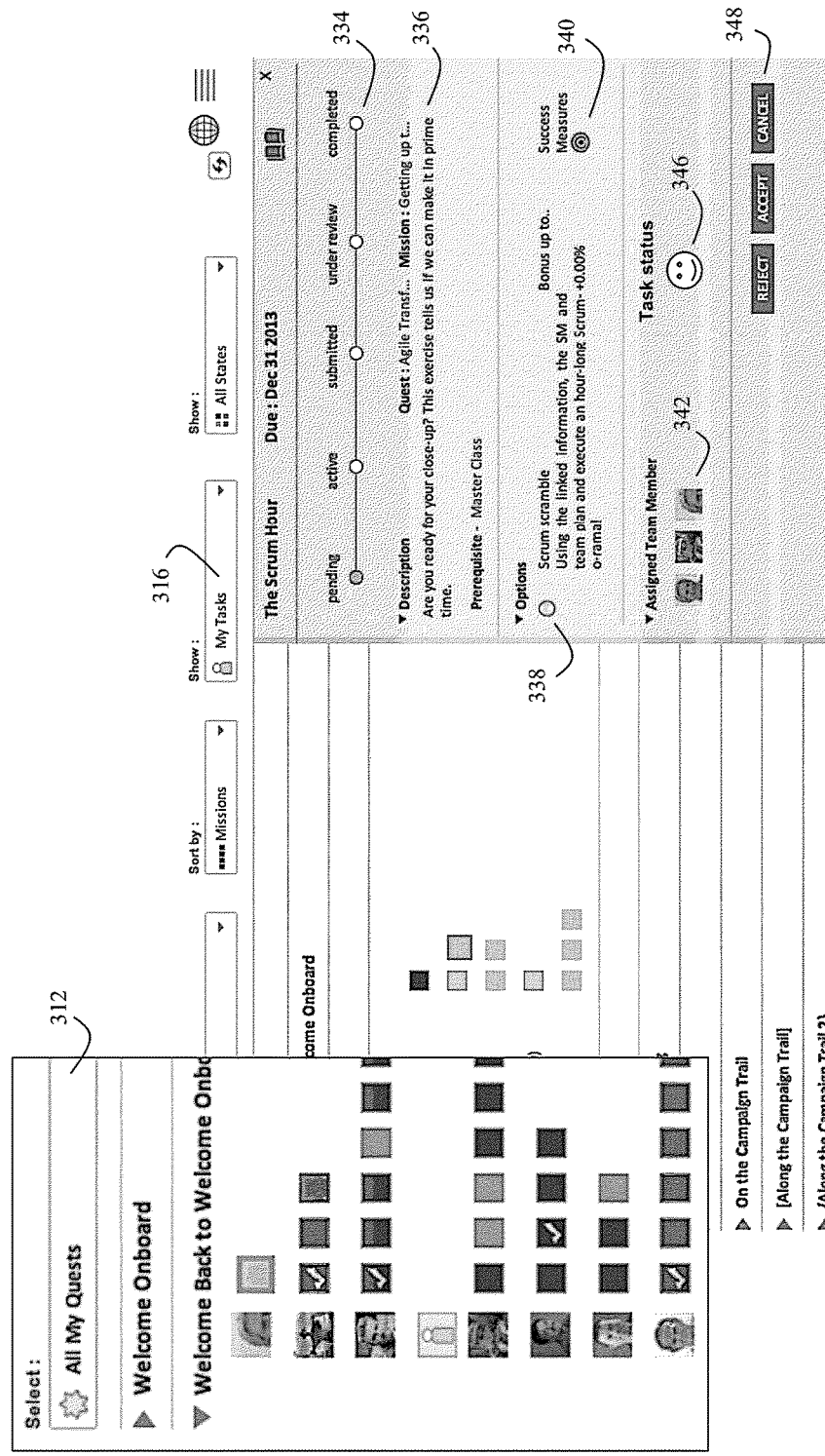
FIG. 10 shows how various team members (players) and managers can, using the user interface, sort through various tasks thus allowing teach task to be individually viewed in more detail. Here a team member has selected the "Welcome onboard" task to look at in further detail.

FIG. 10 shows how various team members (players) and managers can, using the user interface, sort through various quests/projects, milestones, and tasks in different ways thus allowing teach task to be individually viewed in more detail. Here a team member has selected the "Welcome onboard" quest/project and "The Scrum Hour" task to look at in further detail.

FIG. 11 (1100) shows how, in some embodiments team members (players) may use their accumulated points and discretionary points (aka "gold coins") to choose various rewards (306) from a catalog. This catalog may contain various physical objects (gifts), access to various professional activities (i.e. an expense paid seminar or convention), or access to other activities as well. Here the top scorers from past weeks, (here Dave Sh . . . seems to consistently lead) are also shown (1102).

FIG. 12 shows how the entire work product added to the system is saved in memory (e.g. see the FIG. 2 task files data field (223). This data can be fully searchable by quest/project, mission/milestone, task, team member score and other aspects. This information is useful, because it allows organizations to reconstruct successful processes, and avoid failed ones.

In particular, because the system collects data about processes and results, it enables novel organizational insights into what factors are important to project success, and what factors may have been lacking. This can help organizations improve workflow.

The invention claimed is:

1. A method, comprising:
  operating a server configured with gamified project management software to manage at least one project, each project comprising at least one task, at least some of said at least one tasks requiring at least one work product;
  said server comprising at least one processor, memory, and a plurality of network connected computer user interfaces for a plurality of participants;
  said participants comprising a plurality of actual or potential team members and at least one manager, said at least one manager having a higher privilege level than at least some other participants;
  wherein said processor and said gamified project management software automatically configures at least one graphical user interface according to said privilege level of said participants;
  using said at least one graphical user interface to assign at least some participants to at least one task, thereby designating these potential team members as team members;
  using said at least one graphical user interface to assign a plurality of task points to each at least one task, wherein if said task requires work product, at least some of said task points are assigned to said work product;
  using said at least one graphical user interface to assign a plurality of team member points to each team member for at least some actions, to be performed by said team member, that will be subsequently entered into said memory;
  wherein the at least some actions, assigned to an identified team member, require said identified team member to provide at least evidence of completed work product;
  using said server to distribute, to all team members, a common set of standards that communicate a desired state of said at least one task and said evidence of completed work product upon completion;
  using said at least one graphical user interface to enter said identified team member's evidence of completed work product into memory;
  using said at least one graphical user interface and at least one reviewer to retrieve said evidence of completed work product from memory, perform at least one review of said evidence of completed work product against said common set of standards, and for each at the least one reviewer, enter the at least one reviewer's completed work product review into said memory;
  for each review, using results of said at least one reviewer's completed work product review to score said identified team member; and save this score from said identified team member in memory as score results;
  wherein said gamified project management software further comprises a feedback algorithm using a sum of said identified team member's said score results to generate task work product points for successful completion of said task work product, and to store said task work product points, and their link to said identified team member, in memory;
  using said processor and said gamified protect management software to automatically provide, on a plurality of team member graphical user interfaces, at least information to identified team members regarding their task work product points, and at least some information that varies at least according to the task work product points associated with other identified team members, thus creating a game-like competition between different team members.

2. The method of claim 1, wherein said at least some actions within the server comprise at least other actions of acceptance of tasks, uploading information for tasks, rating of tasks, communicating with team members about tasks, consulting or providing learning resources about tasks, and advancing a state of a task toward completion.

3. The method of claim 1, wherein scoring each identified team member's success at completing their assigned task further comprises determining task successful identified team members, and crediting each identified task successful team member with team member task credits for successfully completing that assigned task, said identified team member task credits assigned according to a number of team member points previously assigned to that identified team member's assigned task.

4. The method of claim 1, wherein said feedback algorithm is based upon at least one of:
  a value accorded to each success measure by each reviewer, a total point value available for each task, an importance of the task to the project as a whole, and a relative consistency of ratings by individual reviewers.

5. The method of claim 1, further presenting notifications to all project team members of at least one of: other team members accepting tasks, other team members completing tasks, other team members receiving points for completed tasks, and an inception of a new project.

6. The method of claim 1, further using said processor and said gamified project management software to periodically calculate at least one: of total high scores for that period, total overall high scores throughout a plurality of periods, and a highest score for any task completed during said period.

7. The method of claim 6, further, using at least one processor and said gamified project management software to automatically reward high-scoring participants.

8. The method of claim 1, wherein for at least some of the at least one tasks, a participant requests assignment to a task by using their graphical user interface to transmit a task bid to said manager; wherein said task bid further comprises a proposed number of team member points either said participant or said manager proposes to allocate to said task; and wherein upon acceptance of said bid, said participant is designated a team member, and said proposed number of team member points are assigned to said team member for said at least some actions to be performed by said team member, and entered into said memory.

9. The method of claim 8, wherein at least some of said tasks have multiple task options with a differing number of task points assigned to each said task option, and either said participant or said team member further uses their graphical user interface to request assignment to a specific task option.

10. The method of claim 1, wherein for at least some of the tasks, either said participant or said team member is assigned to a task by said at least one manager using said graphical user interface.

11. The method of claim 1, wherein the team members assigned to a task further use their graphical user interfaces to transmit team member task status information pertaining to their personal assessment of the task status, and said team member provided task status information is aggregated across all team members assigned to a given task and reported as a composite value in a task status portion of said graphical user interfaces.

12. The method of claim 11, wherein said composite value is reported by one or more emoticons.

13. The method of claim 1, wherein said server is further configured by said gamified project management software to allow a first team member or a manager to use a graphical user interface running on a computerized device connected to said server to transfer either said first team member's said team member points or said first team member's said task work product points to a second team member.

14. The method of claim 1, wherein said at least some of said tasks further comprise learning content, said learning content is provided or linked to by said server using said graphical user interface, and said server stores records of a team member's accessing and successfully mastering said learning content in memory.

15. The method of claim 14, wherein said records of a team member's accessing and successfully mastering and learning said learning content is used to automatically trigger the server to reveal subsequent tasks with additional learning content on said team member's graphical user interface.

16. The method of claim 1, wherein said server is further configured by said gamified project management software to provide a task problem input on said graphical user interface running on a computerized device connected to said server, and wherein a team member uses said task problem input to request, using a graphical user interface running on a computerized device connected to said server that said server notify any of a manager, another team member, or a consultant regarding said task problem.

17. The method of claim 16, wherein said server is configured by said gamified project management software to further require manager entered commentary regarding a task's organizational context, as well as numeric ratings regarding a task's importance, urgency, and priority, and wherein said numeric ratings are used as input to a prioritization algorithm configured to rank said task problem, at least as to urgency relative to other task problems, on the graphical user interface running on a computerized device connected to the server of a notified manager, another notified team member, or notified consultant.

18. The method of claim 1, wherein each change in any of the projects, project tasks, task points, participants, team members, team member task assignment, team member points, scoring of team member success at competing said team member's assigned task, and team member task credits is stored in computer memory along with a time and date stamp of the time and date said change occurred, thus allowing a project history to be subsequently retrieved and analyzed.

19. The method of claim 1, further configured to provide said team members with discretionary points, wherein said team member may use said discretionary points and said team member graphical user interface to acquire discretionary point purchasable resources, or to trade with other team members; and
    wherein said discretionary points are provided to said team members according to a gamified project management software algorithm run on said at least one processor that credits said team members for mentoring other team members.

20. The method of claim 1, wherein said server is configured by said gamified project management software to read and write gamified project management system files.

21. The method of claim 20, further converting legacy computerized project management system files to gamified project management system files, said method comprising:
    parsing said legacy computerized project management system files into projects data fields, task data fields, participant data fields, and team member data fields;
    for each task in said project, linking said task data fields to task point data fields, thus providing gamified task data fields;
    for each team member in said project, linking said team member data fields to team member point data fields and team member score results fields, thus providing gamified team member data fields;
    providing additional gamified project management data fields;
    and storing said projects data fields, gamified task data fields, gamified team member data fields, and additional gamified project management data fields in computer memory as gamified project management system files.

22. The method of claim 20, further converting gamified project management system files to legacy computerized project management system files, said gamified project management system files comprising project data fields, gamified task data fields, gamified team member data fields, and additional gamified project management data fields, said method comprising:
    parsing said gamified project management system files into projects data fields, gamified task data fields, and gamified team member data fields;
    for each gamified task in said project, delinking said gamified task data fields from task point data fields, thus providing legacy task data fields;
    for each gamified team member in said project, delinking said gamified team member data fields from said gamified team member said task point data fields and gamified team member score results data fields, thus providing legacy team member data fields;
    removing said additional gamified project management data fields;
    and storing said projects data fields, legacy task data fields, and legacy team member data fields in computer memory as legacy project management system files.

23. The method of claim 1,
    periodically assigning a plurality of task points to each task;
    periodically assigning a plurality of team member points to each team member;
    wherein a sum of a number of team member points expended per task by various team members assigned to that task, is equal to the number of task points;
    wherein the steps of assigning a team member to a task further comprise using said at least one processor and said gamified project management software to require that said team member may never have a negative remaining number of team member points, and for those team members with a positive remaining number of team points, deducting at least some task points from said team member's team member points and crediting these debited task points towards meeting the number of task points assigned to that task;
    and wherein said periodically assigning comprises at least one time during a course of a project.

24. The method of claim 1, wherein said scores are saved in computer memory, thus allowing a profile of knowledge, skills, and abilities of the team members and teams to be preserved for subsequent analysis.

* * * * *